United States Patent
Wang et al.

(10) Patent No.: US 6,830,648 B2
(45) Date of Patent: Dec. 14, 2004

(54) METHOD FOR SEPARATING SUBSTRATE AND THIN-FILM LAYER OF OPTICAL RECORDING MEMORY MEDIA USING ULTRASONIC

(75) Inventors: Jenn-Shing Wang, Yungkang (TW); Pei-Chao Cheng, Yungkang (TW)

(73) Assignee: Far East College, Tainan Hsien (TW)

( * ) Notice: Subject to any disclaimer, the term of this patent is extended or adjusted under 35 U.S.C. 154(b) by 0 days.

(21) Appl. No.: 10/457,413

(22) Filed: Jun. 10, 2003

(65) Prior Publication Data

US 2003/0234077 A1 Dec. 25, 2003

(30) Foreign Application Priority Data

Jun. 20, 2002 (TW) ........................................ 91113428 A

(51) Int. Cl.⁷ .............................................. B32B 35/00
(52) U.S. Cl. ....................... 156/344; 29/403.1; 29/426.4
(58) Field of Search ............................. 29/426.1, 426.3, 29/426.4, 426.5, 426.6, 403.1, 239, 762; 156/344, 584; 264/37.3

(56) References Cited

U.S. PATENT DOCUMENTS

| | | | | |
|---|---|---|---|---|
| 4,439,289 A | * | 3/1984 | Viglione | 205/709 |
| 5,099,618 A | * | 3/1992 | Schmid | 451/57 |
| 5,306,349 A | * | 4/1994 | Nee | 134/1 |
| 6,060,527 A | * | 5/2000 | Shinomiya et al. | 521/40 |

* cited by examiner

*Primary Examiner*—Mark A. Osele
(74) *Attorney, Agent, or Firm*—Troxell Law Office PLLC

(57) ABSTRACT

A method for separating a substrate and a thin-film material of an optical recording memory media using ultrasonic includes steps of placing an optical recording memory media in an ultrasonic environment and using ultrasonic to damage weaker interconnected interfaces of the optical recording memory media, thereby enabling the interconnected interfaces to absorb energies for attenuating or losing adhesive forces thereof with other layers. The entire method has simple operations, authentically completes the separation, facilitates high quality recycling of substrates and thin-film materials of optical recording memory media s, and effectively avoids possible re-contamination during the recycling process.

5 Claims, No Drawings

METHOD FOR SEPARATING SUBSTRATE AND THIN-FILM LAYER OF OPTICAL RECORDING MEMORY MEDIA USING ULTRASONIC

BACKGROUND OF THE INVENTION (a) Field of the Invention

The invention relates to a method for separating a substrate and a thin-film material of an optical recording memory media using ultrasonic, and more particularly, to a method that places an optical recording memory media in an ultrasonic environment and uses ultrasonic to damage weaker interconnected interfaces of the optical recording memory media, thereby enabling the interconnected interfaces to absorb energies for attenuating or losing adhesive forces thereof with other layers.

(b) Description of the Prior Art

Compact discs are categorized according to physical properties thereof, and are generally distinguished as compact disc read-only-memory (CD-ROM), compact disc write-once (CD-WO) and compact disc re-writable (CD-RW). Take the CD-ROM for example, prior compact discs are a type of CD-ROM, and are formed by coating a reflective layer and a protective layer in sequence onto a substrate layer thereof. As for the CD-WO, a commonly known product is compact disc recordable (CD-R), which includes a recording layer, a reflective layer and a protective layer in sequence on a substrate layer thereof. In addition, regarding to the CD-WR, it is consisted of a dielectric layer, a recording layer, a dielectric layer, a reflective layer and a protective layer in sequence on a substrate layer thereof.

All of the aforesaid existing compact disc products have a substrate layer and a thin-film layer that form a main body of the compact disc. Wherein, the substrate layer that composes a main physical structure of the compact disc, is made of materials through which laser beams for reconstructing or recording data can be permeated. These materials, for instance, are made of polycarbonate resin, acrylic acid resin, polyolefine resin, or epoxy.

However, along with considerable increases in demand of the aforesaid compact discs, disposal and processing of waste compact discs have become a serious problem. In addition, damaged compact discs during manufacturing, disqualified compact discs scrapped by inspection after manufacturing, outdated inventory compact discs, and even breaking down of pirate compact discs, have further worsened disposal issues of compact discs.

With respect to disposal of compact discs, so far processes for the scrapped optical recording memory media s include crushing up and landfill, and burning. For the former process, locations for landfill are rather difficult to find, and especially metals contained in thin-film layers of optical recording memory media s yet cause concerns of re-contamination when being buried. For the latter process, special incinerators are needed. Nevertheless, exhaust gases produced from burning yet ought to be properly handled before emission thereof, and hence processing expenses and speeds are quite unsatisfactory. From recycling point of view, both of the aforesaid methods are unfavorable for subsequent recycling processes. For example, suppose a substrate layer in a scrapped optical recording memory media is a printed circuit, an expectation of having the compact disc recycled for serving as a substrate of other optical recording memory media s cannot be possibly reached. Or, even if waste compact discs are recycled to serve as engineering plastics having lower economical values instead of putting optical properties thereof to use, the aforesaid methods are still hardly accounted as appropriate.

To solve the aforesaid issues, there are reformations suggested by domestic and international patent publications or related information for overcoming the difficulties. Referring to the U.S. Pat. No. 5,306,349 and U.S. Pat. No. 6,600,229, scrapped optical recording memory media s are pre-processed using chemical solvents, and substrates and thin-films thereof are then agitated and separated using ultrasonic. Furthermore, referring to the U.S. Pat. No. 5,619,898, and the Taiwan Patent Publication No. 464595, Method and Device for Disposing Scrapped Compact Disc, external mechanical forces are utilized for removing the covered thin-film layer. Referring to the Taiwan Patent Publication No. 443949, Recycling Method for Compact Disc Writable, the compact disc is crushed into fragments and various materials therein are separated using solvents for further utilization. However, of the aforesaid methods, those that use chemicals are liable to cause problems of subsequent recycling and disposal of waste liquids, whereas those that use mechanical methods are unlikely to be completely recycled for compact disc substrates because the substrates are easily scratched. Above all, related equipments and methods of the aforesaid prior inventions are rather expensive and bulky as well as having tricky operations, and thus leading to inconveniences, time waste and complexities.

Furthermore, other methods that recycle the substrate material by removing the thin-film layer using chemical solutes are also proposed; for example, the Japan Patent No. 2615277, and the Japan Patent Publication No. 8-164524. According to the processing method recorded in the publications, the substrate materials are prone to physical changes during the processing thereof, and expected quality of recycled substrates may not be ensured. More particularly, an object of anticipating recycling an entire compact disc for serving as a substrate of other compact discs is basically improbable to achieve, and the recycled product is generally used as engineering plastics having lower economical values instead of being applied according to optical properties thereof. In addition, materials of the polycarbonate substrate after being processed by chemical solutes are likely affected. Not only the polycarbonate substrate cannot be implemented to optical applications having high values, but also mechanical properties thereof are affected, and hence again lowering utilization importance thereof. Besides, processing of the chemical solute wastes still remains as another problem that is not effortlessly solved.

SUMMARY OF THE INVENTION

In the view of the shortcomings of the aforesaid prior process methods of waste compact discs namely having high production cost and troublesome processing, being uneconomical and inefficiently recycled as well as hardly conforming to environmental-friendly requirements, the primary object of the invention is to provide a method for separating a substrate and a thin-film material of an optical recording memory media using ultrasonic. Wherein, a selectivity property of ultrasonic is employed for concentrating energies at interconnected interfaces between layers of a compact disc, and especially interconnected interfaces adjacent to a recording layer of the optical recording memory media. Through comparatively lower strengths of the interconnected interfaces, energies of ultrasonic are absorbed for parting and breaking away from other layers of the compact disc, thereby effectively and rapidly separating the substrate layer from the thin-film layer of the optical recording memory media. Original properties of the separated substrate layer and the thin-film layer are maintained for high-valued recycled products. Using the method according to the invention, highly efficient separation is accomplished by simple operations and lower production cost for subsequent recycling and re-uses. Therefore, the invention has excellences including being reliable, having low production cost and high-valued recycling.

DETAILED DESCRIPTION OF THE PREFERRED EMBODIMENTS

To better understand the contents and effects of the invention, descriptions shall be given in the following examples.

The method for separating a substrate and a thin-film material of an optical recording memory media according to the invention is accomplished by placing an optical recording memory media in an ultrasonic oscillating environment, and damaging weaker interconnected interfaces of the optical recording memory media using ultrasonic, thereby reducing or losing adhesive forces of the interconnected interfaces with other layers due to energies absorbed.

In an example according to the invention, at least one optical recording memory media having a structure comprising at least one layer is placed in a soak bath, and applied with conditions including a frequency of 10–22 KHz, a power of 2 KW and a time period of 1 minute. A reflective layer and a dye layer of the optical recording memory media are then partly separated, whereas rest undetached part of the reflective layer is formed with cracks. This step is able to process a plurality of optical recording memory media s simultaneously, and thus achieving rapid damaging and separation.

According to the aforesaid separating method using ultrasonic, for that optical recording memory media s have multiple layers, the ultrasonic used in the invention is able to damage weaker interconnected interfaces therein, such that layering, membrane splitting or peeling off is occurred to further rapidly separating the interconnected interfaces from other layers.

According to the aforesaid method, when the substrate material is separated from the thin-film material, in order to accelerate a drying speed thereof, moisture on the materials is dried using heat or blowing based upon requirements for subsequent processes.

When the optical recording memory media enters a separation procedure, it is essential that the optical recording memory media is placed in an ultrasonic equipment, appropriate power and time period are adjusted for the separation, and the ultrasonic equipment is disposed in a suitable manner for observation, thereby facilitating an operator to carry out direct eye observation on the separation procedure during the process.

A half-finished product after separation using ultrasonic may be applied with mechanical forces for further and more thorough separation. Or, mechanical forces may utilized for separation, and followed by applying ultrasonic for thorough separation.

During the aforesaid separation using ultrasonic, an externally added liquid may be applied for removing peeled off layers, thereby economizing time and resources required for the separation.

In addition, methods for placing optical recording memory media s into an ultrasonic environment are divided into the following categories:

1. batch mode; optical recording memory media s come into or go out from an ultrasonic environment in batches;
2. semi-continuous mode; when optical recording memory media s are transported into an ultrasonic environment by a delivery belt, the optical recording memory media s are halted for accepting separation using ultrasonic, and are then transported out of the ultrasonic environment by the delivery belt after completing the separation; and
3. continuous mode; when optical recording memory media s are transported into an ultrasonic environment by a delivery belt, the optical recording memory media s continue to be forwarded while accepting separation using ultrasonic, and are then transported out of the ultrasonic environment by the delivery belt after completing the separation.

All the aforesaid modes are able to accomplish objects of damaging and separation, and are suitable for the method according to the invention.

Furthermore, due to differences in materials, manufacturing parameters and qualities of optical recording memory media s, strengths of weakest interconnected interfaces thereof are not exactly the same, and therefore a preferable oscillation frequency range of ultrasonic is between 1 KMHz to 10 MHz. However, other oscillation frequencies capable of causing layering and damaging are also included in the range appropriate for the method according to the invention.

The aforesaid optical recording memory media s applicable to the method for separation the substrate from the thin-film layer thereof using ultrasonic, include music CD-ROM, CD-ROM, video CD, CD-interactive (CD-I), digital versatile disc (DVD)-videos, digital versatile disc-read only memory (DVD-ROM), CD-WO, write-once read-many (WORM), digital versatile disc-random access memory (DVD-RAM), CD-RW, magneto-optical (MO), mini-disc (MD) and digital versatile disc re-writable (DVD-RW). All the above stated compact discs have multiple-layer structures, and therefore binding forces thereof tend to differ. Ultrasonic is able to spoil such binding bonds, and weakest interconnected interfaces therein are damaged for having absorbed energies first to further cause layering or cracking, which finally leads to separation of the thin-film material. Therefore, all the aforesaid optical recording memory media s are appropriate for the method according to the invention.

Moreover, conditions of the soak bath for shortening removal time periods such as increase in temperature, addition of organic solvents, application of vacuum cleaning and running water, and agitating using mechanical forces, are all included in the scope of the invention.

The aforesaid organic solvents are combinations having appropriate ratios from any the following: solvents having strong cleaning strengths and high flash points as well as being dissolvable in water, emollient solvents softening strengths between layers, buffer adjuvants reducing corrosion that the aforesaid emollient solvents have on substrates, additive accelerants promoting speed of damage of the aforesaid emollient solvents with respect to layered structures, additive antistatic adjuvants preventing peeled off adhesive objects from re-adhering to substrates.

Using the aforesaid method, only simple processing procedures have to be carried out for recycling waste optical recording memory media s into non-deformed substrate materials. In addition, the recycled substrate materials are high in purity that makes continuous recycling possible. Unwanted thin-film layers are removed and substrate materials are obtained from recycling waste optical recording memory media s, and hence an excellence of substantially lowering production cost of compact discs is achieved.

In an embodiment according to the invention, the processing is targeted at compact discs with a substrate layer having a recording layer, a reflective layer and a protective layer. However, damaged products during manufacturing of optical recording memory media s, disqualified compact discs scrapped by inspection after manufacturing, or even outdated inventory compact discs with expected standards, are all applicable to the method according to the invention. In other words, regardless of the type of layered structures contained in the substrate layer, as long as multiple-layer structures are present, the same aforesaid method according to the invention may be used for authentically recycling substrate materials thereof.

The procedure for recycling optical recording memory media s using the method according to the invention comprises the steps of:

a. Classification: Diverse optical recording memory media s are classified according recycling materials. For example, materials such as gold, silver and aluminum contained in the reflective layers are classified differently. Or, the optical recording memory media s may be classified according to disparities in substrate materials thereof.

b. Separation using ultrasonic: At least one optical recording memory media is placed in an ultrasonic environment, which is applied with conditions including a frequency of 10–22 KHz, a power of 2 KW and a time period of 1 minute, such that a reflective layer and a dye layer of the optical recording memory media are partly separated, and a substrate layer of the optical recording memory media is also separated from a thin-film layer thereof.

c. Recycling: The separated substrate material and the thin-film material are individually recycled for further utilization.

In the aforesaid example of recycling procedure of optical recording memory media s, the separation method in accordance with the invention enables the recycling procedure of optical recording memory media s to be implemented in a faster way while offering better economical values. At the same time, the recycled products are maintained with high utilization values and are also capable of controlling issues of re-contamination.

The method in accordance with the invention offers industrial utilization values, for that the processing method is suitable for recycling substrate materials of damaged products during manufacturing of optical recording memory media s, disqualified compact discs scrapped by inspection after manufacturing, or even outdated inventory compact discs with expected standards. The recycled substrate materials are high in purity, and therefore the recycled substrate can be properly re-used as substrates in optical recording memory media s, or can be extensively put in use in compact disc packages or housings of personal computers. The easily used recycled compact discs have high economical values, and are also capable of effectively avoiding possible re-contamination in recycling processes.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A method of separating a substrate and a thin-film material of an optical recording memory media using ultrasonic comprising the steps of:

(a) placing an optical recording memory media in an ultrasonic environment;

(b) using ultrasonic to damage weaker interconnected interfaces of the optical recording memory media; and (c) enabling the interconnected interfaces to absorb energies for attenuating and losing adhesive forces thereof with other layers, wherein the ultrasonic environment is a soak bath containing a liquid and capable of producing ultrasonic oscillations, wherein the soak bath works in coordination with increases in temperature, addition of organic solvents, application of vacuum cleaning and running water, and agitating using mechanical forces for shortening a time period required for separation, wherein the organic solvents are combinations having appropriate ratios from any of solvents having strong cleaning strengths and high flash points as well as being dissolvable in water, emollient solvents softening strengths between layers, buffer adjuvants reducing corrosion that the aforesaid emollient solvents have on substrates, additive accelerants promoting speed of damage of the aforesaid emollient solvents with respect to layered structures and additive antistatic adjuvants preventing peeled off adhesive objects from re-adhering to the substrate.

2. The method for separating a substrate and a thin-film material of an optical recording memory media using ultrasonic in accordance with claim 1, wherein conditions applied to the ultrasonic environment include a frequency of 10 to 22 KHz, a power of 2 KW, and a time period of 1 minute.

3. The method of separating a substrate and a thin film material of an optical recording memory media using ultrasonic in accordance with claim 1, wherein a half-finished product after separating by ultrasonic is directly applied with mechanical forces for further and more thorough separation, or mechanical forces are utilized for separation and followed by applying ultrasonic for thorough separation.

4. The method for separating a substrate and a thin-film material of an optical recording memory media using ultrasonic in accordance with claim 1, wherein an externally added liquid is applied for removing peeled off layers.

5. The method for separating a substrate and a thin-film material of an optical recording memory media using ultrasonic in accordance with claim 1, wherein placement of the optical recording memory media into the ultrasonic environment is carried out in a mode selected from the group consisting of batch mode, semi-continuous mode and continuous mode.

* * * * *